United States Patent
Nakashima

(10) Patent No.: US 10,241,822 B2
(45) Date of Patent: Mar. 26, 2019

(54) INFORMATION PROCESSING APPARATUS FOR MOVING VIRTUAL MACHINE AND METHOD OF MOVING VIRTUAL MACHINE

(71) Applicant: FUJITSU LIMITED, Kawasaki-shi, Kanagawa (JP)

(72) Inventor: Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 14 days.

(21) Appl. No.: 15/442,849

(22) Filed: Feb. 27, 2017

(65) Prior Publication Data
US 2017/0255484 A1    Sep. 7, 2017

(30) Foreign Application Priority Data
Mar. 4, 2016 (JP) ................. 2016-042495

(51) Int. Cl.
G06F 9/46 (2006.01)
G06F 9/455 (2018.01)
H04L 29/08 (2006.01)

(52) U.S. Cl.
CPC ........ G06F 9/45558 (2013.01); H04L 67/101 (2013.01); H04L 67/1097 (2013.01); H04L 67/32 (2013.01); G06F 2009/4557 (2013.01); G06F 2009/45583 (2013.01); G06F 2009/45595 (2013.01)

(58) Field of Classification Search
None
See application file for complete search history.

(56) References Cited

U.S. PATENT DOCUMENTS

| 7,313,793 B2 * | 12/2007 | Traut ................. G06F 9/45537 709/201 |
| 2010/0250868 A1 | 9/2010 | Oshins |
| 2011/0302577 A1 * | 12/2011 | Reuther ............. G06F 9/45558 718/1 |

FOREIGN PATENT DOCUMENTS

| JP | 2009-059121 A | 3/2009 |
| JP | 2012-521610 A | 9/2012 |

* cited by examiner

*Primary Examiner* — Gregory A Kessler
(74) *Attorney, Agent, or Firm* — Fujitsu Patent Center

(57) ABSTRACT

It is provided an information processing apparatus. The information processing apparatus receives a request from a first information processing apparatus which operates a first virtual machine in which a plurality of nodes associated with storage areas are included and in which the plurality of nodes mutually access the storage areas for accepting move of the first virtual machine from the first information processing apparatus. And the information processing apparatus moves the plurality of nodes in the first virtual machine on a node basis when the request is received, starts, after a first node of the plurality of nodes in the first virtual machine is moved, operation of the first node, and suspends, when the first node accesses a storage area associated with a second node which is not moved from the first virtual machine, the operation of the first node until move of the second node is completed.

5 Claims, 15 Drawing Sheets

FIG. 3

| NUMA ID | PAGE | CPU CORE | |
|---|---|---|---|
| X | 1 (0x0000-0x1000)<br>2 (0x1000-0x2000) | a<br>c | b<br>d |
| Y | 3 (0x2000-0x3000)<br>4 (0x3000-0x4000) | e<br>g | f<br>h |

FIG. 6

| NUMA ID | PAGE | V. CPU CORE | |
|---|---|---|---|
| X0 | 10 (0x0000-0x1000) | a0 | b0 |
| X1 | 20 (0x1000-0x2000) | c0 | d0 |

| RESOURCE | PHYSICAL SERVER | VIRTUAL MACHINE |
|---|---|---|
| PAGE | 1 | 10 |
| | 2 | 20 |
| CPU CORE | a | a0 |
| | b | b0 |
| | c | c0 |
| | d | d0 |

12

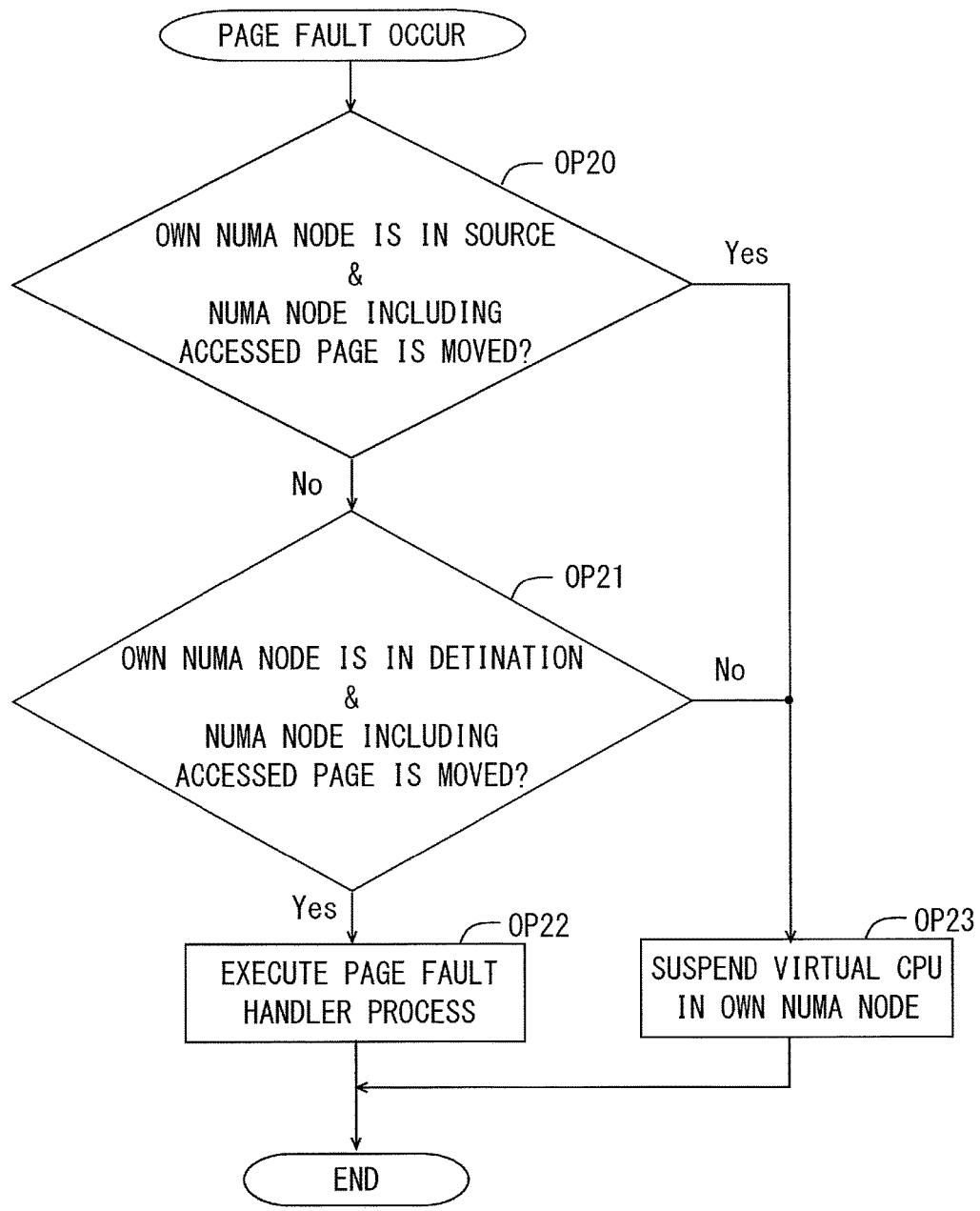

INFORMATION PROCESSING APPARATUS FOR MOVING VIRTUAL MACHINE AND METHOD OF MOVING VIRTUAL MACHINE

CROSS-REFERENCE TO RELATED APPLICATION

This application is based upon and claims the benefit of priority of the prior Japanese Patent Application No. 2016-042495, filed on Mar. 4, 2016, the entire contents of which are incorporated herein by reference.

FIELD

The embodiments discussed herein are related to an information processing apparatus and a method of moving a virtual machine.

BACKGROUND

In a so-called cloud system in which services and applications are provided for users over a network, physical servers operates various Virtual Machines (VMs). When the physical servers operate VMs, the prediction of the operation of each VM is hard because the operations of the VMs vary depending on services and applications provided by the VMs. Thus, the estimation of resources such as Central Processing Units (CPUs) and memory used by the VMs is also hard.

When the memory resources become scarce, the performances of the physical servers decrease due to slashing. In a virtual memory environment, the slashing occurs when the inputs and outputs between physical memory and virtual memory including secondary memory, external memory and auxiliary memory frequently occur due to insufficient memory and the CPU does not accept external processing.

When memory resource becomes scarce, the source physical server moves predetermined virtual machines to a destination physical server. When the physical server moves the predetermined virtual machines to another physical server, memory in the source physical server which has been used by the moved virtual machines is released. Therefore, the source physical server can use the released memory. When the move of the predetermined virtual machines to the destination physical server is completed, the destination physical server can start to operate. Hereinafter, a physical server is referred to as information processing apparatus.

The following patent document describes conventional techniques related to the techniques described herein.

PATENT DOCUMENT

[Patent document 1] Japanese National Publication of International Patent Application No. 2012-521610
[Patent document 2] Japanese Laid-Open Patent Publication No. 2009-59121

SUMMARY

According to one embodiment, it is provided an information processing apparatus which operates a virtual machine in which a plurality of nodes associated with storage areas are included and in which the plurality of nodes mutually access the storage areas.

The information processing apparatus includes a processor and memory storing an instruction for causing the processor to execute receiving a request from a first information processing apparatus which operates a first virtual machine in which a plurality of nodes associated with storage areas are included and in which the plurality of nodes mutually access the storage areas, the request requesting for accepting move of the first virtual machine from the first information processing apparatus, moving the plurality of nodes in the first virtual machine on a node basis when the request is received, starting, after a first node of the plurality of nodes in the first virtual machine is moved, operation of the first node, and suspending, when the first node accesses a storage area associated with a second node which is not moved from the first virtual machine, the operation of the first node until move of the second node is completed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3 is a diagram illustrating an example of a distance table which defines configurations of NUMA nodes;
FIG. 6 is a diagram illustrating an example of a virtual distance table which defines configurations of NUMA nodes on a virtual machine;
FIG. 7 is a diagram illustrating an example of a resource relation table which defines relations between resources on a physical server and resources on a virtual machine;
FIG. 16 is a diagram illustrating an example of a flowchart of a process for controlling an operation of a virtual machine.

DESCRIPTION OF EMBODIMENTS

Since the memory in the source physical server is not released before the move of the virtual machines to the destination physical server is completed in the conventional techniques, a problem related to insufficient memory cannot be resolved. When the memory resource becomes scarce, the performance of the source physical server decreases. Thus, it is desirable to release the memory which has been used by the moved virtual machines when a part of memory used by the virtual machines is moved to the destination physical server. In addition, it is also desirable that operations corresponding to the moved parts in the destination physical server are started before the whole process for moving the virtual machines is completed. However, when a part of memory used by a virtual machine on the source physical server is moved and the virtual machine tries to access the moved memory, the process performed by the virtual machine cannot be continued. Further, when a part of memory used by a virtual machine on the source physical server is moved, the operation of the virtual machine on the destination physical server is started and the virtual machine tries to access memory which has not been moved, the process performed by the virtual machine cannot be continued. Embodiments are described below with reference to the drawings. Configurations of the following embodiment are exemplifications, and the present apparatus is not limited to the configurations of the embodiment.

Comparative Example

When the moving of the virtual machine 2B to the physical server 1B is completed, the physical server 1A releases the memory used by the virtual machine 2B before the moving (P2). The virtual machine 2A reuses pages which have been used by the virtual machine 2B (P3). It is noted that a page is a predetermined size of memory blocks.

Figure 1:
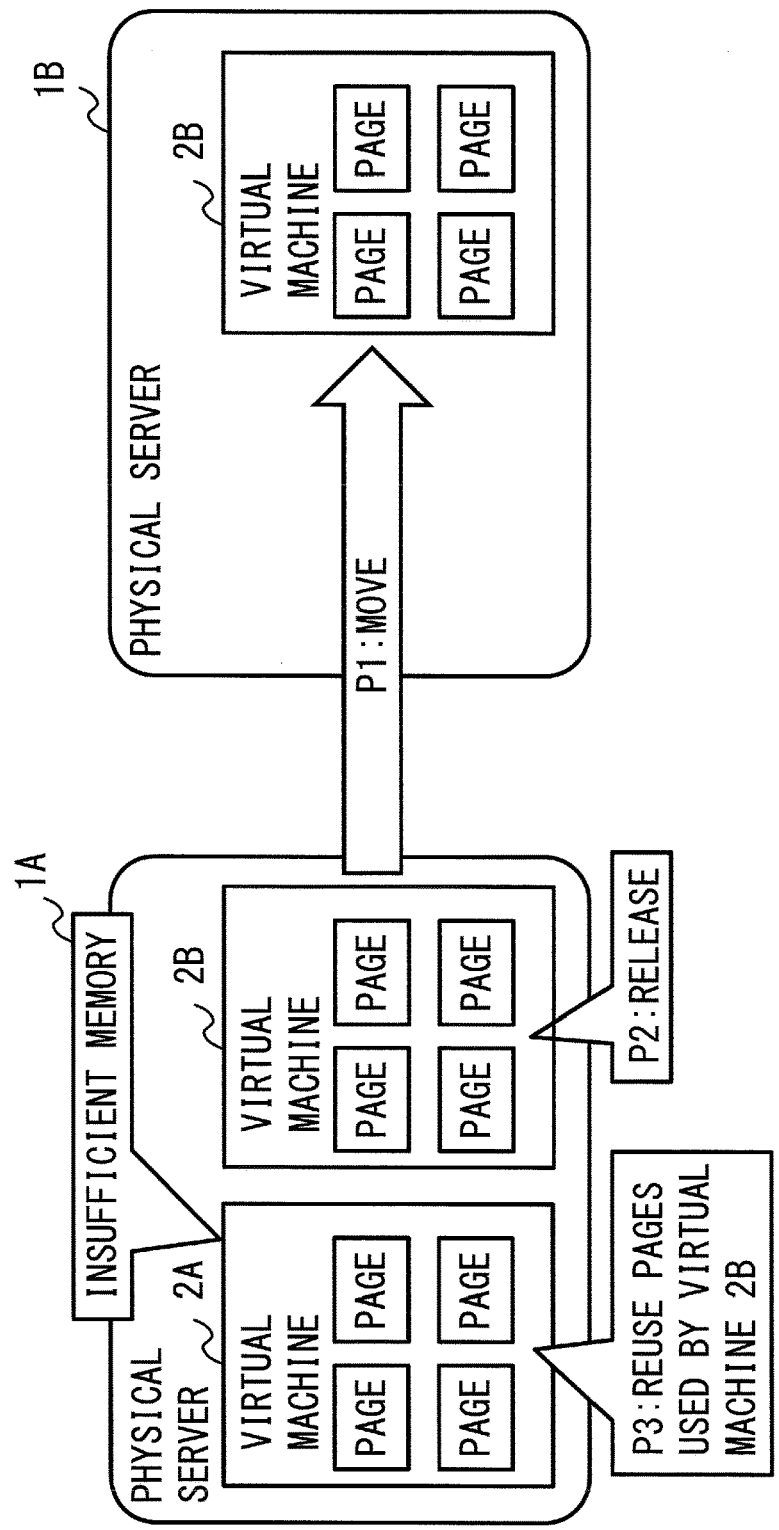
FIG. 1 is a diagram illustrating an example of a process for releasing memory after a virtual machine is moved.

In the example illustrated in FIG. 1, the memory which has been used by the virtual machine 2B in the physical server 1A is not released until the moving of the virtual machine 2B to the physical server 1B is completed. That is, the insufficient memory of the virtual machine 2A is not resolved until the moving of the virtual machine 2B to the physical server 1B is completed. It is noted that the physical server 1A and the physical server 1B are collectively referred to as a physical server 1 below. It is also noted that the virtual machine 2A and the virtual machine 2B are collectively referred to as a virtual machine 2 below.

<Method of Moving Virtual Machine>

So-called Live Migration as one of methods of moving virtual machines is described with reference to an example in FIG. 1. In the Live Migration, the source physical server 1A moves the virtual machine 2B to the destination physical server 1B with the virtual machine 2B being operating.

Specifically, the physical server 1A transfers pages on the memory used by the virtual machine 2B to the destination physical server 1B. When the transfer of the pages is completed, the physical server 1A retransfers pages which are updated during the previous transfer of the pages to the physical server 1B. Further, the physical server 1A retransfers pages which are updated during the previous transfer of the pages to the physical server 1B. When the physical server 1A repeats the retransfer of the updated pages and the size of the updated pages becomes equal to or smaller than a predetermined threshold, the physical server 1A terminates the operation of the virtual machine 2B. Then, the physical server 1A retransfers the updated pages to the physical server 1B and terminates the retransfer of pages on the memory. The destination physical server 1B starts the operation of the virtual machine 2B. The source physical server 1A deletes the virtual machine 2B in the physical server 1A and releases the memory used by the virtual machine 2B in the physical server 1A.

When the memory release is performed at the stage where a part of pages are moved to the physical server 2B, the virtual machine 2B in the physical server 1A may terminate the operation because the virtual machine 2B may try to access the moved pages. Therefore, since the possibility of the termination of the virtual machine 2B increases depending on the order of pages to be transferred, the performance of the virtual machine 2B decreases.

Embodiment

In the present embodiment, the physical server 1 moves the virtual machine 2 to the destination physical server 1 with the virtual machine 2 being operating. When a part of memory in the virtual machine 2 is transferred to the destination physical server 1, the source physical server 1 releases the part of the memory. Specifically, the physical server 1 builds the virtual machine 2 by using NUMA nodes including pairs of a CPU and memory. The physical server 1 moves the virtual machine 2 to the destination physical server 1 on a NUMA node basis. In each time when a NUMA node is moved to the destination physical server 1, the physical server 1 releases the memory used by the moved NUMA node. It is noted that the physical server is an example of an information processing apparatus.

<NUMA Node>

Figure 2:
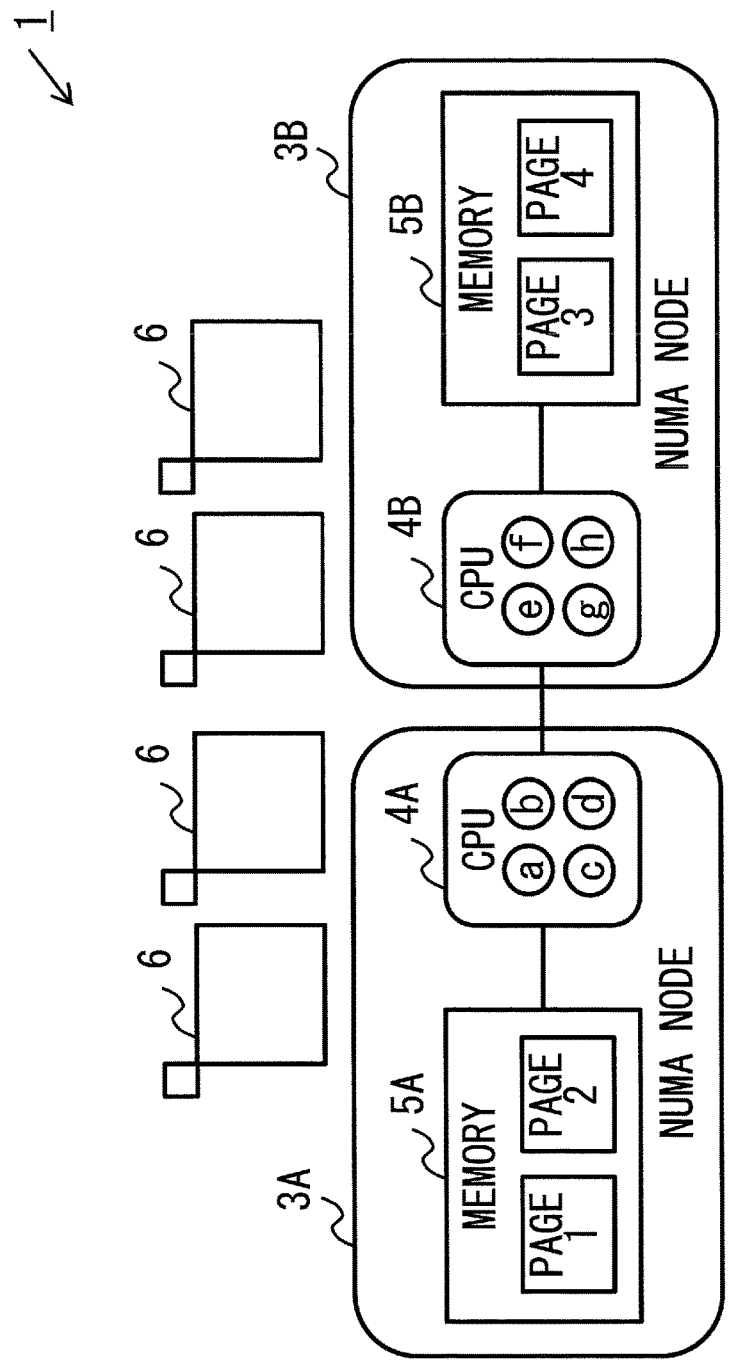
FIG. 2 is a diagram illustrating an example of information processing apparatus in which a non-uniform memory access (NUMA) environment is built.

FIG. 2 illustrates an example of information processing apparatus 1 (physical server 1) in which a NUMA environment is built. The information processing apparatus 1 in which a NUMA environment is built is referred to as a NUMA type computer. The NUMA environment includes a plurality of NUMA nodes each of which includes a pair of a CPU and memory.

In the example in FIG. 2, the information processing apparatus 1 includes a NUMA node 3A and a NUMA node 3B. The NUMA node 3A includes a CPU 4A and memory 5A. The CPU 4A is a multicore processor and includes four cores a, b, c and d. The memory 5A includes a page 1 and a page 2 each of which is a memory block with a predetermined size. Similarly, the NUMA node 3B includes a CPU 4B and memory 5B. The CPU 4B is a multicore processor and includes four cores e, f, g and h. The memory 5B includes a page 3 and a page 4 each of which is a memory block with a predetermined size.

The NUMA node 3A and the NUMA node 3B are collectively referred to as a NUMA node 3 below. The CPU 4A and the CPU 4B are collectively referred to as a CPU 4 below. The memory 5A and the memory 5B are collectively referred to as memory 5 below.

The information processing apparatus 1 executes a plurality of processes 6. A modern Operating System (OS) such as Linux (Registered Trademark) ensures that memory used by the processes executed on the information processing apparatus 1 resides in the NUMA node 3. For example, the frequency of accesses to the memory 5B in the NUMA node 3B by the processes 6 which use the memory 5A in the NUMA node 3A becomes lower than the frequency of accesses to the memory 5A in the NUMA node 3B by the processes 6.

FIG. 3 illustrates an example of a distance table 10 which defines a configuration of the NUMA node 3. The distance table 10 is read from a configuration file on the startup of the OS. The OS allocates the CPU 4 and the memory 5 to each process 6 based on the distance table 10. FIG. 3 illustrates an example in which the configuration of the NUMA node 3 illustrated in FIG. 2 is defined. The distance table 10 includes items such as NUMA ID, page and CPU core.

The item "NUMA ID" indicates identifiers for the NUMA node 3. For example, the distance table 10 in FIG. 3 defines two NUMA nodes the NUMA ID of which is "X" and "Y". It is noted that the NUMA ID of the NUMA node 3A in FIG. 2 is defined as "X" and the NUMA ID of the NUMA node 3B in FIG. 2 is defined as "Y".

The item "page" indicates pages included in the memory 5 of the NUMA node 3. For example, page "1" and page "2" are defined as pages included in the NUMA node 3A the NUMA ID of which is "X". In addition, page "3" and page "4" are defined as pages included in the NUMA node 3B the NUMA ID of which is "Y". Each page is specified by an address range on the memory. For example, the pages "1", "2", "3" and "4" correspond to memory blocks the address ranges for which are "0x0000-0x1000", "0x1000-0x2000", "0x2000-0x3000" and "0x3000-0x4000", respectively.

The item "CPU core" indicates cores included in the CPU 4 in the NUMA node 3. For example, CPU cores a, b, c and d are defined as the cores included in the CPU 4A in the NUMA node 3A. In addition, CPU cores d, f, g and h are defined as the cores included in the CPU 4B in the NUMA node 3B.

<Apparatus Configuration>

Figure 4:
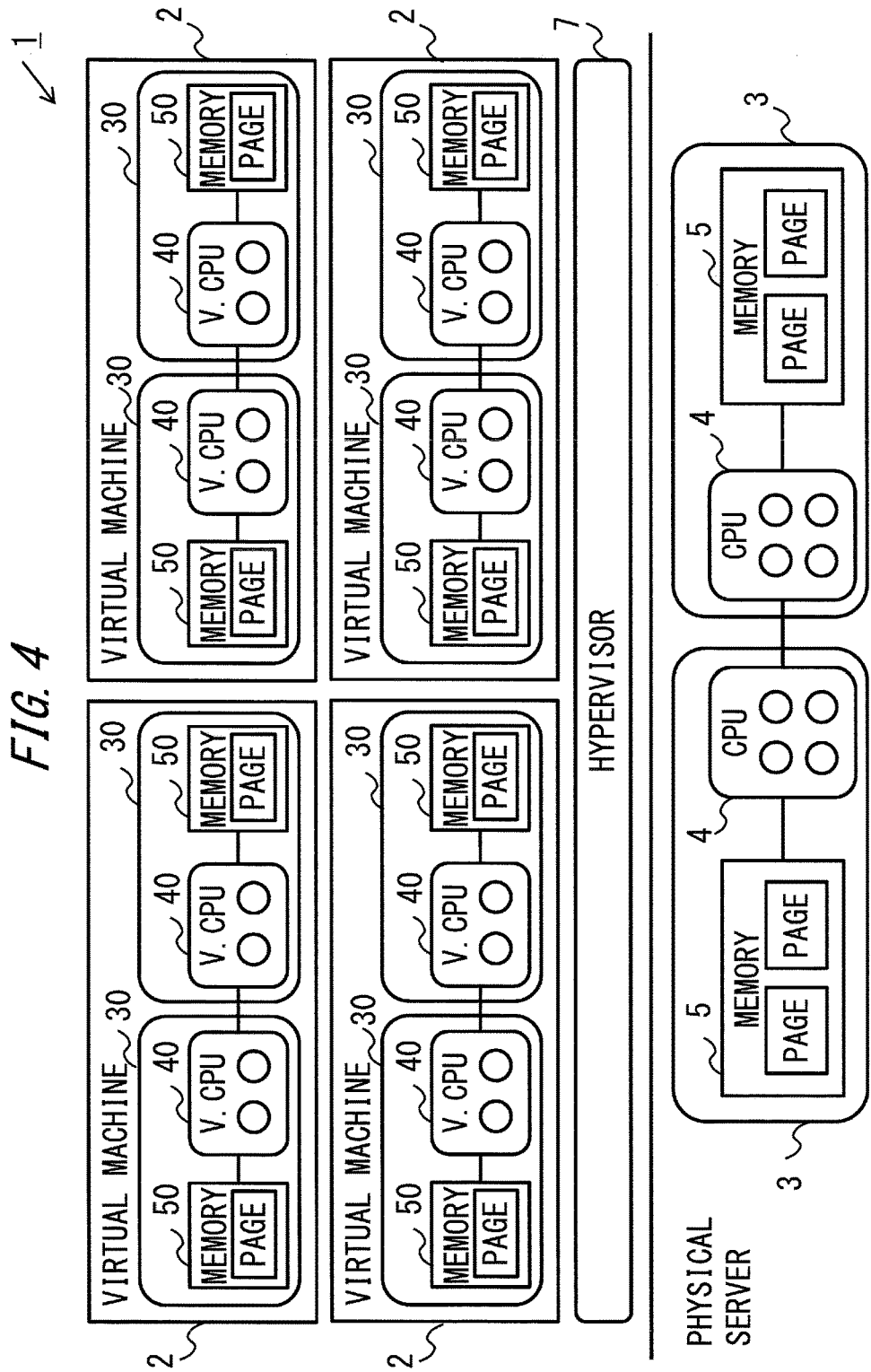
FIG. 4 is a diagram illustrating an example of a configuration of an information processing apparatus.

FIG. 4 is a diagram illustrating an example of an apparatus configuration of the information processing apparatus 1. The information processing apparatus 1, or the physical server 1, includes a plurality of NUMA nodes 3 and hypervisors 7 and operates a plurality of virtual machines 2. In the example in FIG. 4, the information processing apparatus 1 includes two NUMA nodes 3 and two hypervisors 7 and operates four virtual machines 2.

Each NUMA node 3 includes a CPU 4 and memory 5. The CPU 4 loads various programs into the memory 5 and executes the programs to execute various processes as described below. In addition, the CPU 4 can be configured as a multicore processor including a plurality of cores or a multiprocessor including a combination of a plurality of processors. It is noted that the CPU 4 is associated with each NUMA node 3 according to the distance table 10.

The memory 5 provides the CPU 4 with a storage area for loading the various computer programs and a work area for executing the various computer programs. In addition, the memory 5 is used as a buffer for retaining data. For example, the memory 5 is semiconductor memory such as Read Only Memory (ROM) or RandomAccess Memory (RAM). The memory 5 is administered on a basis of page with a predetermined size of memory block. The memory 5 is associated with each NUMA node 3 according to the distance table 10.

The hypervisor 7 is software for virtualizing the information processing apparatus 1 and operating a plurality of virtual machines 2 in parallel. The hypervisor 7 receives the distance table 10 from the OS of the information processing apparatus 1 which defines the virtual configurations of the NUMA nodes to build a virtual NUMA environment in each virtual machine. The CPU 4 of the information processing apparatus 1 executes the computer programs to execute the processes of the hypervisor 7. It is noted that the hypervisor 7 is an example of a "control unit".

Each virtual machine 2 includes a plurality of virtual NUMA nodes 30 which are referred to as NUMA node 30 in case. Each NUMA node 30 includes a virtual CPU 40 and memory 50. It is noted that the NUMA node 30 is an example of "node".

One or more CPU cores of the CPU 4 are allocated to the virtual CPU 40 to execute the programs. In addition, CPU cores can be allocated to the virtual CPU 40 according to time slicing based on a predetermined time period.

Pages of the memory 5 are allocated to the memory 50 and the memory 50 provides the virtual CPU 40 included in the NUMA node 30 in which the memory 50 is included with a storage area for loading the programs and a work area for executing the programs. It is noted that the memory 50 is an example of "storage area".

<Virtual NUMA Environment>

Figure 5:
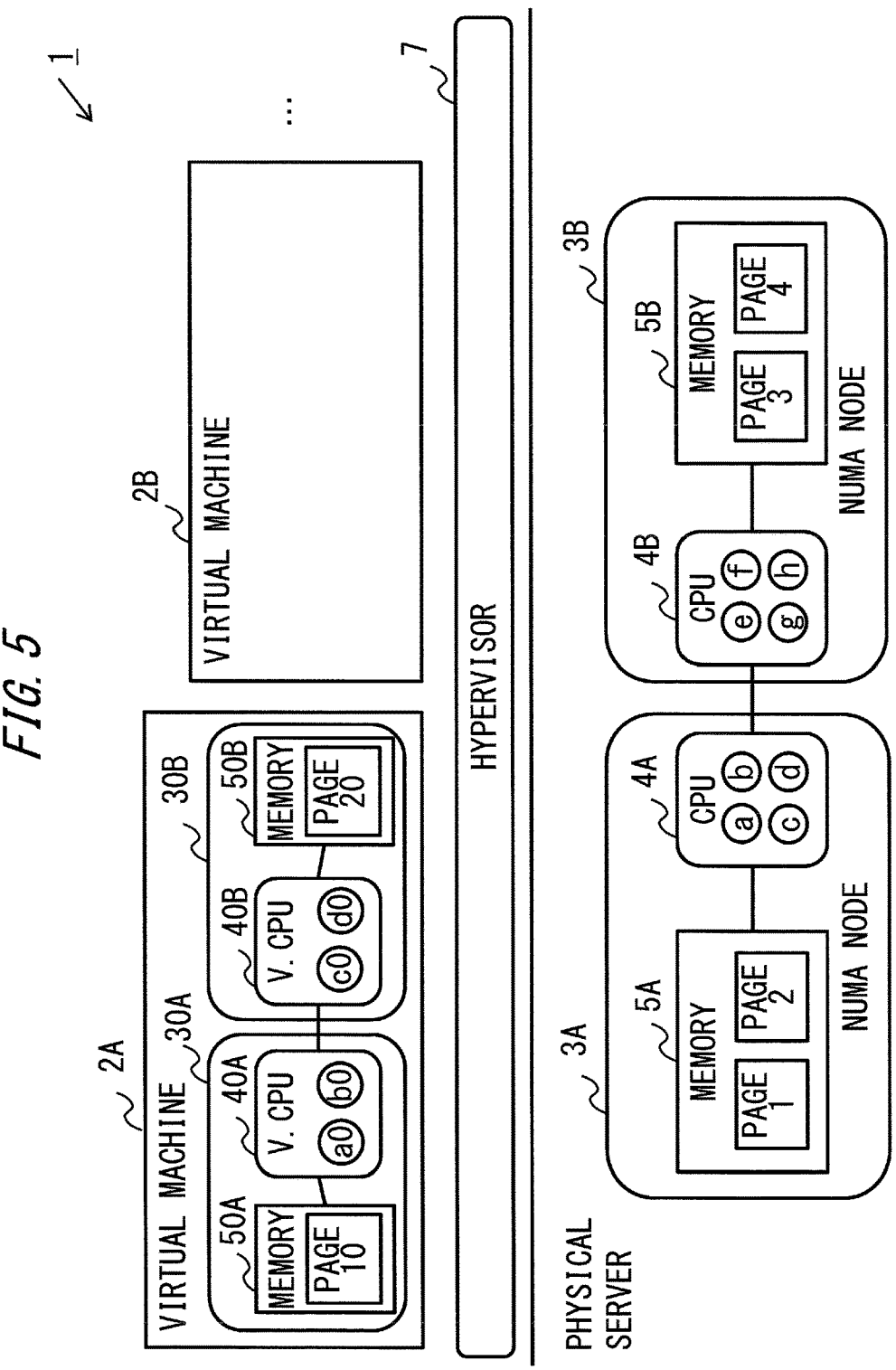
FIG. 5 is a diagram illustrating an example of a relation between a NUMA node on a virtual machine and a NUMA node on a physical server.

Referring to FIGS. 5 to 7, descriptions are provided below for building a NUMA environment of the virtual machine 2 in the information processing apparatus 1. The NUMA environment of the virtual machine 2 is referred to as a virtual NUMA environment.

FIG. 5 illustrates an example of relations between NUMA node 30 on the virtual machine 2 and NUMA node 30 on the physical server 1. In the example in FIG. 5, the information processing apparatus 1 includes two NUMA nodes 3A and 3B and a hypervisor 7 and operates a plurality of virtual machines 2A and 2B. Since the hypervisor 7 is similar to the hypervisor in FIG. 4, the detailed descriptions of the hypervisor 7 are omitted here.

The NUMA node 3A includes a CPU 4A and memory 5A. The CPU 4A is a multicore processor including four cores a, b, c and d. The memory 5A includes a page 1 and a page 2 each of which is a memory block with a predetermined size. Similarly, the NUMA node 3B includes a CPU 4B and memory 5B. The CPU 4B is a multicore processor and includes four cores e, f, g and h. The memory 5B includes a page 3 and a page 4 each of which is a memory block with a predetermined size.

The virtual machine 2A includes two NUMA nodes 30A and 30B. The NUMA node 30A includes a virtual CPU 40A and memory 50A. The virtual CPU 40A includes two cores a0 and b0. The memory 50A includes a page 10. Similarly, the NUMA node 30B includes a virtual CPU 40B and memory 50B. The virtual CPU 40B includes two cores c0 and d0. The memory 50B includes a page 20.

FIG. 6 illustrates an example of a virtual distance table 11 which defines the configurations of the NUMA node 30 on the virtual machine 2A. The virtual distance table 11 is read from a file such as a configuration file upon the startup of the hypervisor 7. The hypervisor 7 can be configured to receive the information of the virtual distance table 11 from the OS upon the startup. Alternatively, a user can specify the configurations of the NUMA node 30 on the virtual machine 2A defined in the virtual distance table 11.

The hypervisor 7 retains a virtual distance table 11 for each virtual machine 2. The OS in the virtual machine 2 allocates the virtual CPUs 40A and 40B and the memory 50A and 50B to the processes 6 according to the virtual distance tables 11. FIG. 6 illustrates an example of configurations of the NUMA nodes 30A and 30B included in the virtual machine 2A in FIG. 5. The virtual distance table 11 includes items of NUMA ID, Page and Virtual CPU Core.

The item "NUMA ID" indicates identifiers of the NUMA node 30. The virtual distance table 11 defines the configurations of the two NUMA nodes 30 the NUMA ID of which are "X0" or "X1". Namely, the NUMA ID of the NUMA node 30A is defined as "X0" and the NUMA ID of the NUMA node 30B is defined as "X1" in FIG. 5.

The item "Page" indicates pages included in the memory 50 of the NUMA node 30. In the example, the page "10" is defined as a page included in the NUMA node 30A the NUMA ID of which is "X0". In addition, the page "20" is defined as a page included in the NUMA node 30B the NUMA ID of which is "X1". Each page can be defined according to the address range of the memory. For example, the pages "10" and "20" correspond to memory blocks the address ranges of which are "0x0000-0x1000" and "0x1000-0x2000", respectively.

The item "Virtual CPU Core" indicates cores included in the virtual CPU 40 in the NUMA node 30. For example, two CPU cores a0 and b0 are defined as cores included in the virtual CPU 40A of the NUMA node 30A. In addition, two CPU cores a0 and b0 are defined as cores included in the virtual CPU 40A of the NUMA node 30A.

FIG. 7 illustrates an example of a resource relation table 12 which defines relations between resources on the physical server 1 and resources on the virtual machine 2. The resource relation table 12 is read from a configuration file upon the startup of the hypervisor 7. The hypervisor 7 can receive the information of the resource relation table 12 from the OS upon the startup. Alternatively, a user can specify the relations between the resources on the physical server 1 and the resources on the virtual machine 2 defined in the resource relation table 12.

The hypervisor 7 retains a resource relation table 12 for each virtual machine 2. The hypervisor 7 allocates the resources on the physical server 1 to the virtual machine 2 according to the virtual distance tables 12. FIG. 7 illustrates an example of relations between the resources on the physical server 1 and the resources on the virtual machine 2A in the example in FIG. 5. The resource relation table 12 includes items of Resource, Physical Server and Virtual Machine.

The item "Resource" indicates resources for which the relations are defined regarding the physical server 1 and the virtual machine 2. In the example in FIG. 7, the relations the resources including pages and CPU cores between the physical server 1 and the virtual machine 2.

The item "Physical Server" indicates identifiers of the resources such as pages and CPU sores on the physical server 1. In addition, the item "Virtual Machine" indicates identifiers of the resources such as pages and CPU cores on the virtual machine 2.

In the example in FIGS. 5 and 7, the pages "1" and "2" on the physical server 1 are allocated to the pages "10" and "20" on the virtual machine 2A, respectively. It is noted that the pages "1" and "2" is pages in the memory 5A included in the NUMA node 3A. In addition, the page "10" on the virtual machine 2A is a page in the memory 50A included in the NUMA node 3A. Further, the page "20" on the virtual machine 2A is a page in the memory 50B included in the NUMA node 3B.

The CPU cores a, b, c and d of the physical server 1 are allocated to the CPU cores a0, b0, c0 and d0 of the virtual machine 2A, respectively. The CPU cores a, b, c and d of the physical server 1 are CPU cores included in the CPU 4A in the NUMA node 3A. In addition, the CPU cores a0 and b0 of the virtual machine 2A are CPU cores included in the CPU 40A in the NUMA node 30A. Further, the CPU cores c0 and d0 of the virtual machine 2A are CPU cores included in the CPU 40B in the NUMA node 30B <Moving NUMA Node>

FIGS. 8 to 12 illustrate processes for moving the virtual machine 2 from the source physical server 1A which is referred to as physical server 1A to the destination physical server 1B which is referred to as physical server 1B. The virtual machine 2 is moved on a NUMA node basis from the physical server 1A to the physical server 1B.

IN FIGS. 8 to 12, the virtual machine 2 as a target of the move which operates on the physical server 1A includes two NUMA nodes 30A and 30B. The NUMA node 30A includes the virtual CPU 40A and the memory 50A. The virtual CPU 40A includes two CPU cores. The memory 50A includes a page associated with the NUMA node 30A. In addition, the NUMA node 30B includes the virtual CPU 40B and the memory 50B. The virtual CPU 40B includes two CPU cores. The memory 50B includes a page associated with the NUMA node 30B.

In the drawings, when the virtual CPU 40A or the virtual CPU 40B is operating, a CPU core in the respective CPU is indicated as a filled circle. In addition, when the virtual CPU 40A or the virtual CPU 40B is being suspended, a CPU core in the respective CPU is indicated as an open circle.

The NUMA nodes 30A and 30B are collectively referred to as NUMA node 30. The virtual CPUs 40A and 40B are collectively referred to as virtual CPU 40. The memory 50A and 50B are collectively referred to as memory 50.

In FIGS. 8 to 12, the physical servers 1A and 1B include the hypervisors 7A and 7B, respectively. The hypervisors 7A and 7B control the move of the virtual machine 2.

The hypervisors 7A and 7B include page state tables 13A and 13B, respectively. The page status table 13A is updated by the hypervisor 7A of the physical server 1A. The page status table 13B is updated by the hypervisor 7B of the physical server 1B.

The data structures of the page state tables 13A and 13B are similar to each other and the page state tables 13A and 13B are collectively referred to as page status table 13. The page status table 13 administers the status of the transfer of pages included in the NUMA nodes 30A and 30B in the virtual machine 2 as a target of the move.

The page status table 13 includes items such as NUMA ID, Page and Transfer Status. The item "NUMA ID" indicates identifiers of the NUMA node 30. In FIGS. 8 to 12, the NUMA ID of the physical server 1A is "X0" and the NUMA ID of the physical server 1B is "X2".

The item "Page" indicates page numbers of pages included in the memory 50 of the NUMA node 30. The item "Transfer Status" indicates whether the NUMA node 30 including the respective page is moved to the physical server 1B. "Not Yet" in the item means that the move of the NUMA node 30 to the physical server 1B has not been completed and "Done" in the item means that the move of the NUMA node 30 to the physical server 1B has been completed. Namely, the item "Transfer Status" is not updated when a page in the NUMA node 30 is transferred to the physical server 1B and is updated to "Done" when the move of the NUMA node 30 to the physical server 1B on a NUMA node basis is completed.

Figure 8:
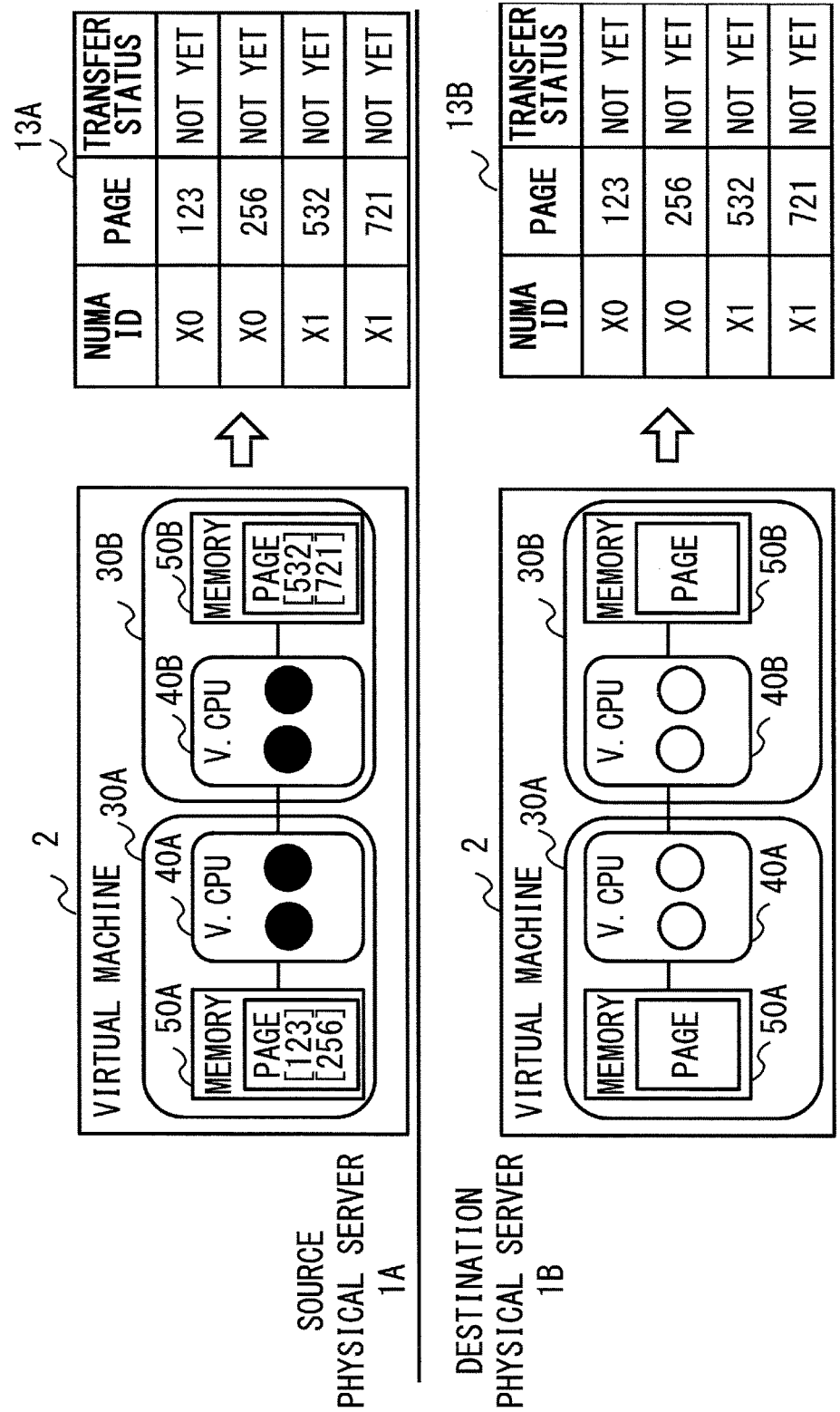
FIG. 8 is a diagram illustrating an example of a process for generating an empty virtual machine on a destination physical server.

FIG. 8 illustrates an example of processes for generating an empty virtual machine 2 in the destination physical server 1B. The hypervisor 7B of the physical server 1B generates an empty virtual machine 2 for operating the virtual machine 2 moved from the physical server 1A. The empty virtual machine 2 generated in the physical server 1B is built to achieve the configurations of the NUMA node 30 in the virtual machine 2 in the physical server 1A.

In the present example, the virtual CPUs 40A and 40B of the physical server 1A are operating. On the other hand, the virtual CPUs 40A and 40B of the physical server 1B are being suspended.

The memory 50A of the physical server 1A includes pages [128] and [256]. The memory 50B of the physical server 1A includes pages [532] and [721]. On the other hand, the memory 50A and 50B of the physical server 1B are empty because pages are not allocated to the memory 50A and 50B.

The page status table 13A indicates "Not Yet" for the status of the transfer of the pages [123] and [256] since the move of the NUMA node 30A including the pages [123] and [256] to the physical server 1B has not been completed. Also, the page status table 13A indicates "Not Yet" for the status of the transfer of the pages [532] and [721] since the move of the NUMA node 30B including the pages [532] and [721] to the physical server 1B has not been completed. Since the page status table 13B is similar to the page status table 13A, the detailed descriptions of the page status table 13B are omitted here.

Figure 9:
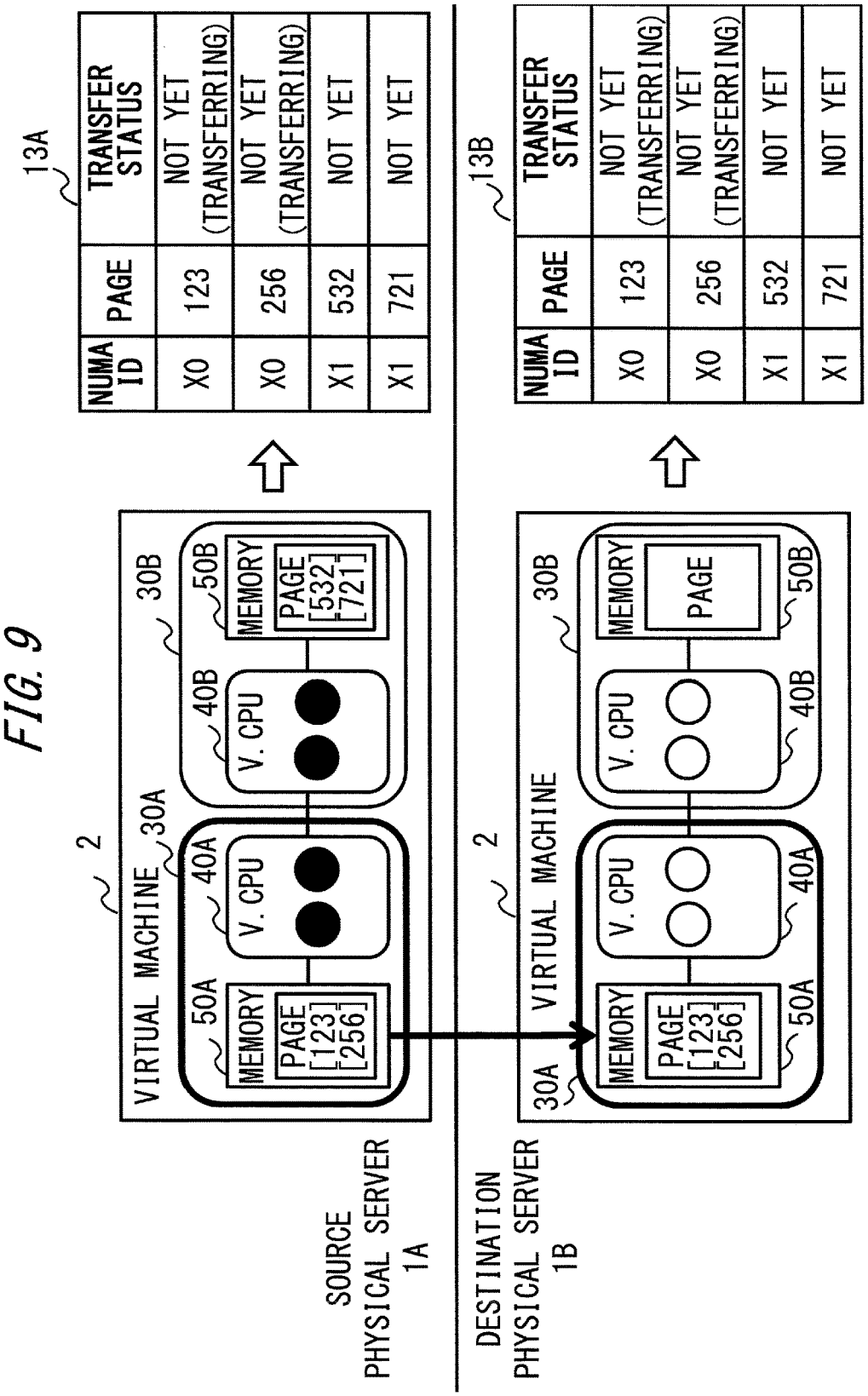
FIG. 9 is a diagram illustrating an example of a process for moving virtual machines on a NUMA node basis.

FIG. 9 illustrates an example of processes for moving the virtual machine 2 on a NUMA node basis. In the example in FIG. 9, the NUMA node 30 including the memory 50A including the pages [123] and [256] is operating on the physical server 1B.

As is the case with the example in FIG. 8, the virtual CPUs 40A and 40B of the physical server 1A are operating. On the other hand, the virtual CPUs 40A and 40B of the physical server 1B are being suspended.

The memory 50A of the physical server 1A includes pages [123] and [256]. The memory 50B of the physical server 1A includes pages [532] and [721]. The memory 50A of the physical server 1B includes pages [123] and [256] which are being transferred. The memory 50B of the physical server 1B is empty since pages are not allocated to the memory 50B of the physical server 1B.

The page status table 13A indicates "Not Yet" for the status of the transfer of the pages [123] and [256] since the pages [123] and [256] are being transferred to the physical server 1B, that is the NUMA node 30A is being moved to the physical server 1B. Also, the page status table 13A indicates "Not Yet" for the status of the transfer of the pages [532] and [721] since the move of the NUMA node 30B including the pages [532] and [721] to the physical server 1B has not been completed. Since the page status table 13B is similar to the page status table 13A, the detailed descriptions of the page status table 13B are omitted here.

Figure 10:
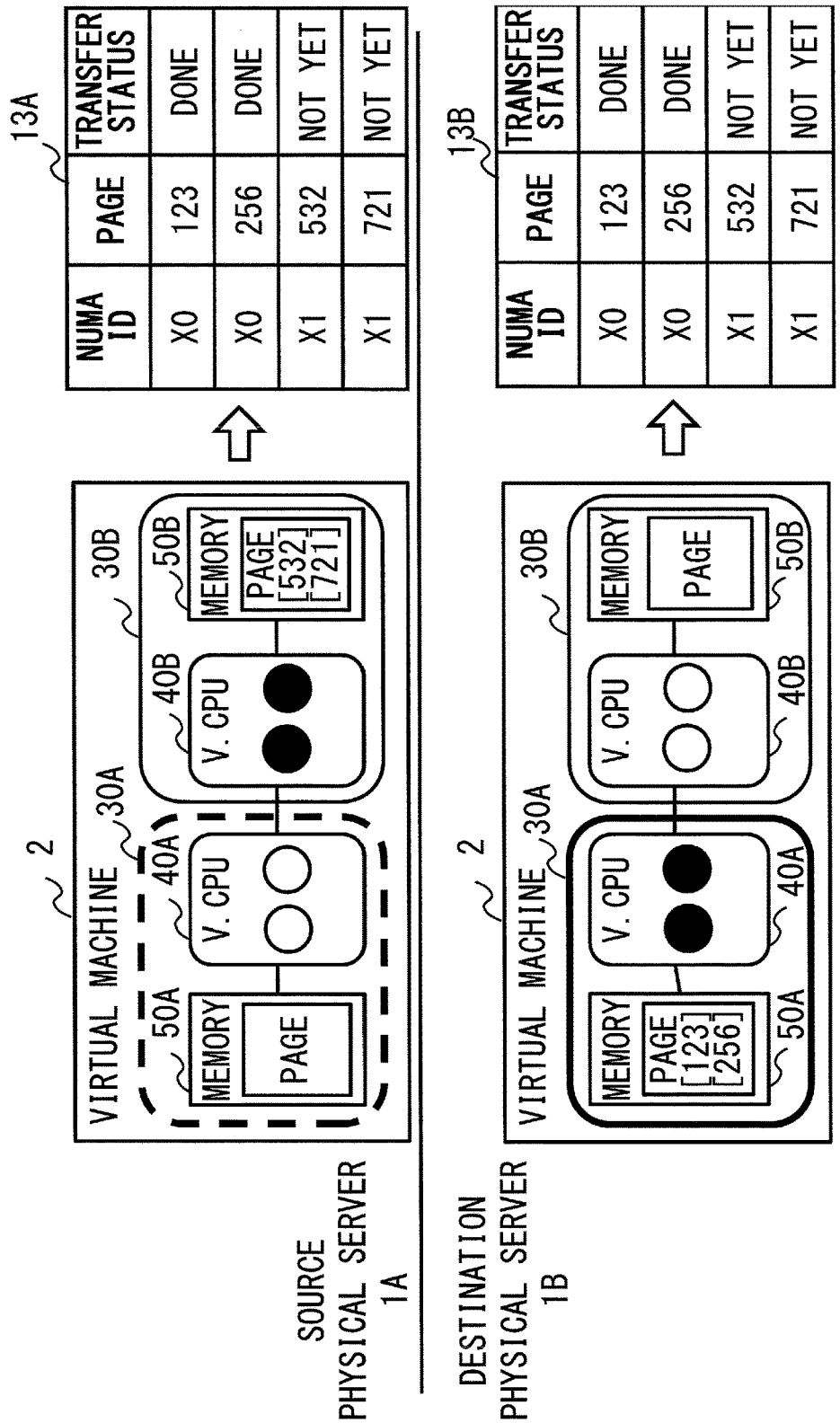
FIG. 10 is a diagram illustrating an example of a process for terminating and starting a NUMA node.

FIG. 10 illustrates an example of processes for suspending and starting the NUMA node 30A. The example in FIG. 10 illustrates that the move of the NUMA node 30A to the physical server 1B is completed. The hypervisor 7A of the physical server 1A suspends the operation of the NUMA node 30A on the physical server 1A when the move of the NUMA node 30A to the physical server 1B is completed. In addition, the hypervisor 7A releases the memory 50A of the NUMA node 30A. Further, the hypervisor 7B of the physical server 1B starts the operation of the NUMA node 30A on the physical server 1B.

As a result, the virtual CPU 40A of the physical server 1A is suspended and the virtual CPU 40A of the physical server 1B is operating. On the other hand, the virtual CPU 40B of the physical server 1A is operating and the virtual CPU 40B of the physical server 1B is being suspended.

The memory 50A of the physical server 1A is released. The memory 50B of the physical server 1A includes pages [532] and [721]. In addition, the memory 50A of the physical server 1B includes pages [123] and [256] which are transferred from the physical server 1A. The memory 50B of the physical server 1B is empty since pages are not allocated to the memory 50B of the physical server 1B.

The page status table 13A indicates "Done" for the status of the transfer of the pages [123] and [256] since the pages [123] and [256] are transferred to the physical server 1B, that is the NUMA node 30A is moved to the physical server 1B. Also, the page status table 13A indicates "Not Yet" for the status of the transfer of the pages [532] and [721] since the move of the NUMA node 30B including the pages [532] and [721] to the physical server 1B has not been completed. Since the page status table 13B is similar to the page status table 13A, the detailed descriptions of the page status table 13B are omitted here.

Figure 11:
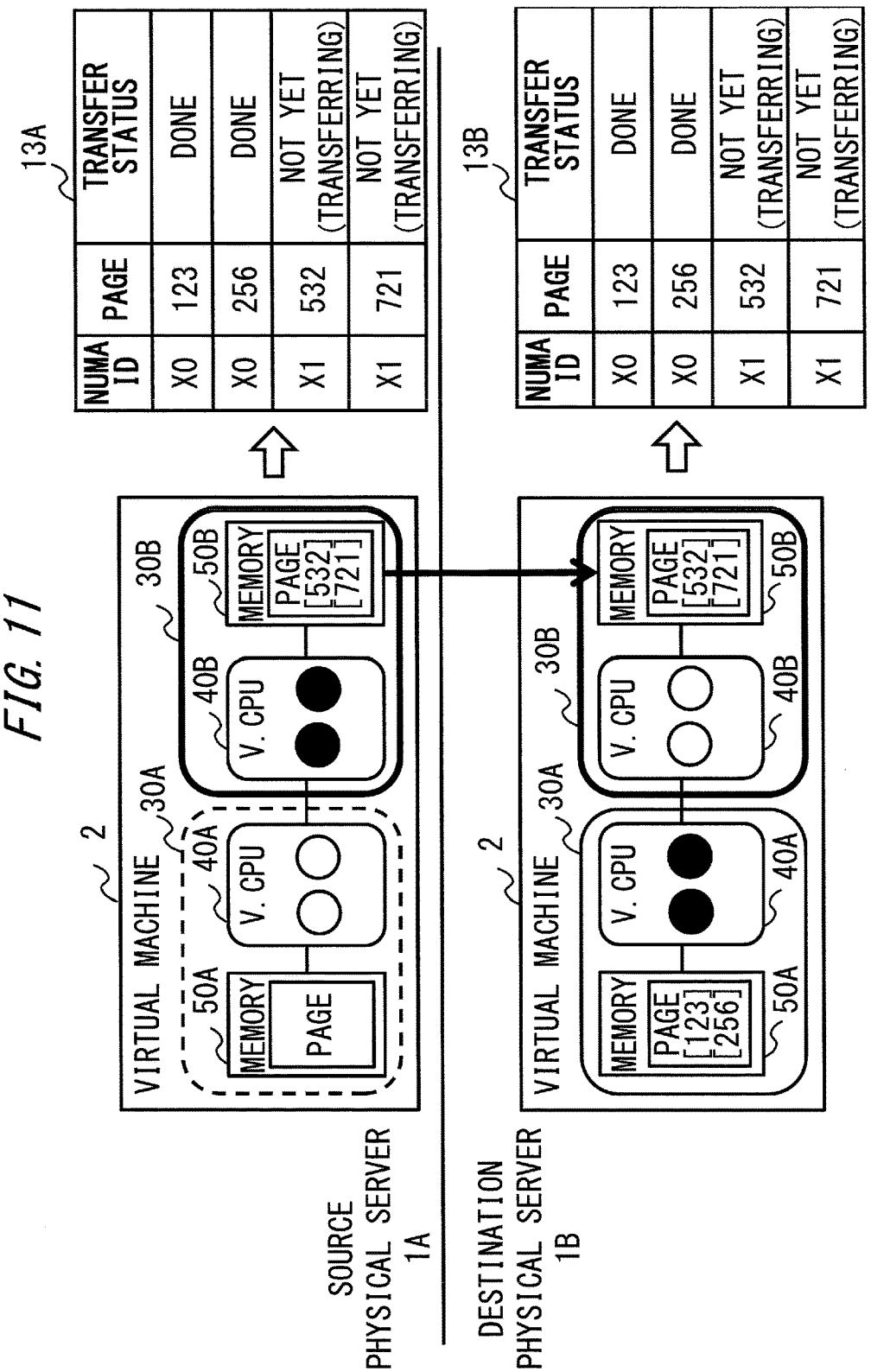
FIG. 11 is a diagram illustrating an example of a process for moving another NUMA node.

FIG. 11 illustrates an example of processes for moving other NUMA nodes. The example in FIG. 11 illustrates that the NUMA node 30B including the memory 50B including the pages [532] and [721] is being transferred to the physical server 1B.

The virtual CPU 40A of the physical server 1A is being suspended and the virtual CPU 40B of the physical server 1A is operating. In addition, the virtual CPU 40A of the physical server 1B is operating and the virtual CPU 40B of the physical server 1B is being suspended.

The memory 50A of the physical server 1A is released. The memory 50B of the physical server 1A includes the pages [532] and [721]. In addition, the memory 50A of the physical server 1B includes the pages [123] and [256] which are transferred from the physical server 1A. The memory 50B of the physical server 1B includes the pages [532] and [721] which is being transferred.

The page status table 13A indicates "Done" for the status of the transfer of the pages [123] and [256] since the pages [123] and [256] are transferred to the physical server 1B, that is the NUMA node 30A is moved to the physical server 1B. Also, the page status table 13A indicates "Not Yet" for the status of the transfer of the pages [532] and [721] since the pages [532] and [721] are being transferred to the physical server 1B, that is the NUMA node 30B is being moved to the physical server 1B. Since the page status table 13B is similar to the page status table 13A, the detailed descriptions of the page status table 13B are omitted here.

Figure 12:
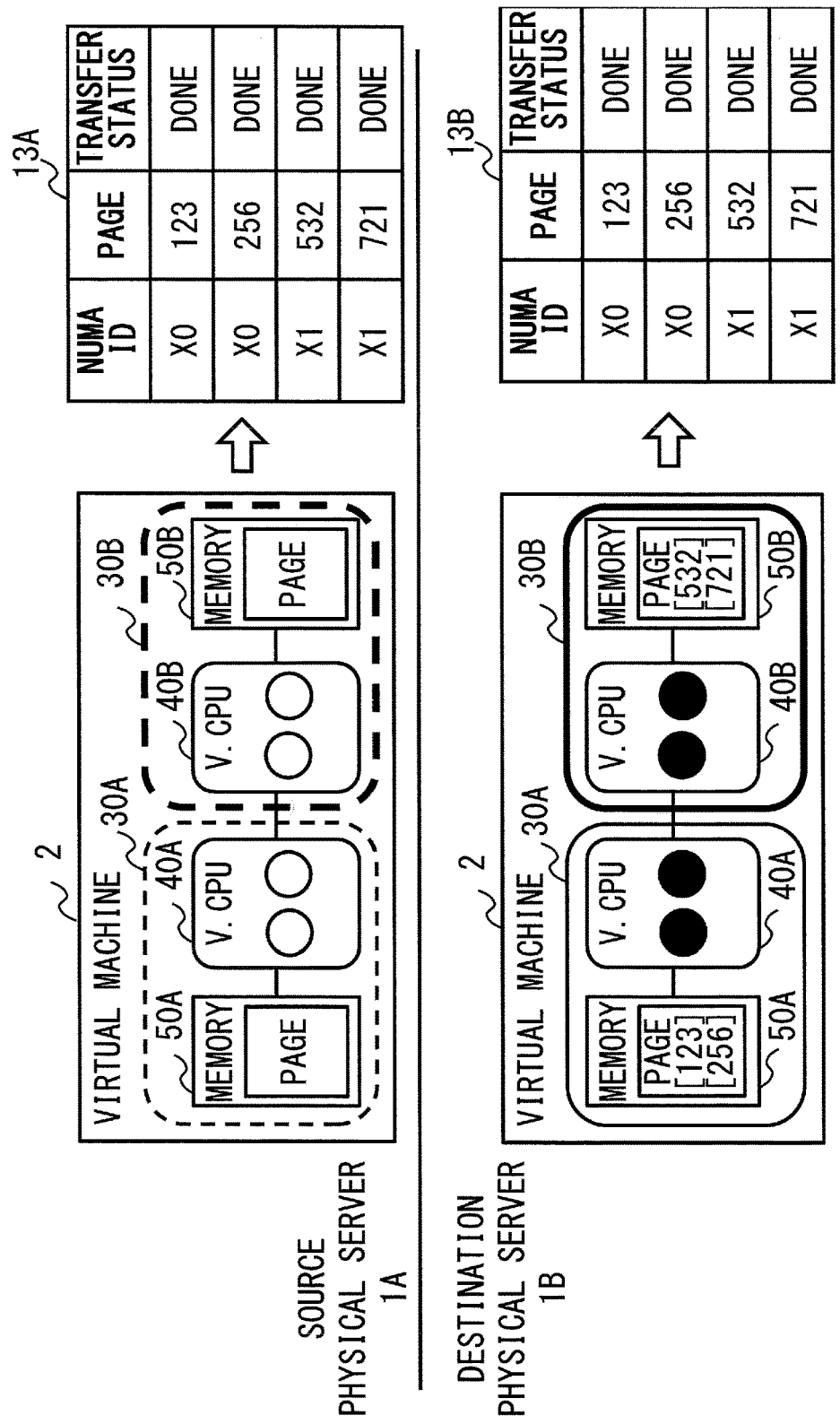
FIG. 12 is a diagram illustrating an example of a process for terminating and starting another NUMA node.

FIG. 12 illustrates an example of processes for suspending and starting other NUMA nodes. The example in FIG. 12 illustrates that the move of the NUMA node 30B to the physical server 1B is completed. The hypervisor 7A of the physical server 1A suspends the operation of the NUMA node 30B on the physical server 1A when the move of the NUMA node 30B to the physical server 1B is completed. In addition, the hypervisor 7A of the physical server 1A releases the memory 50B of the NUMA node 30B. Further, the hypervisor 7B of the physical server 1B starts the operation of the NUMA node 30B on the physical server 1B.

The virtual CPU 40B of the physical server 1A is being suspended and the virtual CPU 40B of the physical server 1B is operating. In addition, the virtual CPU 40A of the physical server 1A is being suspended and the virtual CPU 40A of the physical server 1B is operating.

The memory 50A and 50B of the physical server 1A are released. The memory 50A of the physical server 1B includes the pages [123] and [256]. In addition, the memory 50B of the physical server 1B includes the pages [532] and [721].

The page status table 13A indicates "Done" for the status of the transfer of the pages [123] and [256] since the pages [123] and [256] are transferred to the physical server 1B, that is the NUMA node 30A is moved to the physical server 1B. Also, the page status table 13A indicates "Done" for the status of the transfer of the pages [532] and [721] since the pages [532] and [721] are transferred to the physical server 1B, that is the NUMA node 30B is moved to the physical server 1B. Since the page status table 13B is similar to the page status table 13A, the detailed descriptions of the page status table 13B are omitted here.

<Controlling Operation of Virtual CPU>

Figure 13:
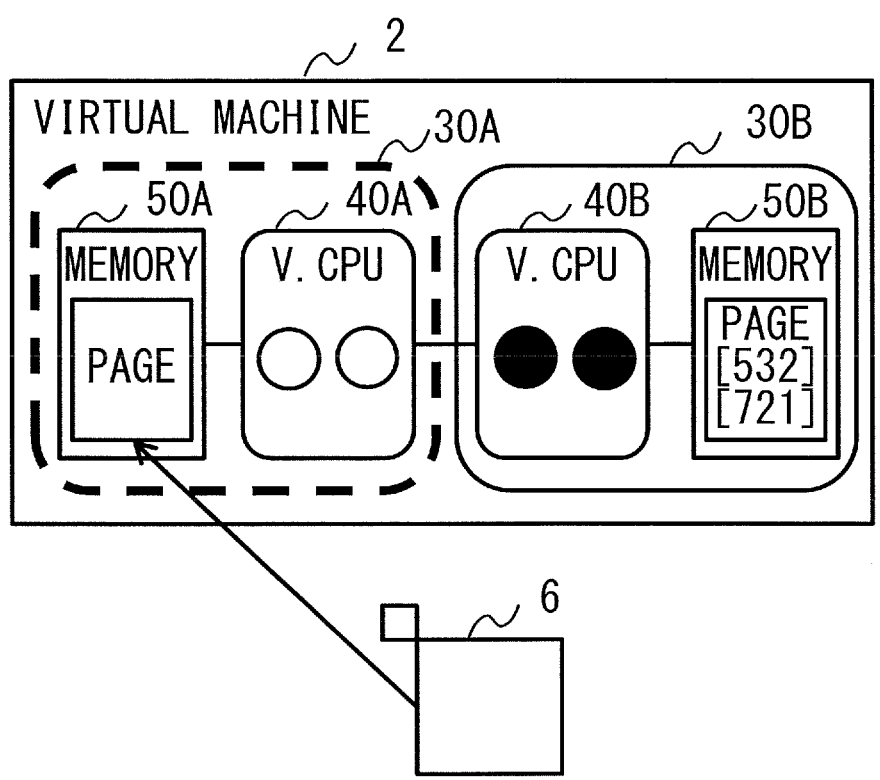
FIG. 13 is a diagram illustrating an example of a process for terminating a virtual CPU on a source physical server.

FIG. 13 illustrates an example of processes for suspending the virtual CPU 40B of the source physical server 1A. The example in FIG. 13 illustrates a status similar to the status of the virtual machine 2 on the physical server 1A in FIG. 10. Namely, the example in FIG. 13 illustrates that the move of the NUMA node 30A to the physical server 1B has been completed. It is noted that the memory 50A of the NUMA node 30A is released.

The process 6 which is being executed may access a page which has been included in the memory 50A before the memory 50 is released. Thus, the hypervisor 7A refers to the page status table 13A. And the hypervisor 7A suspends the virtual CPU 40B which executes the process 6 when the page status table 13A indicates "Done" for the transfer status of the page accessed by the process 6, that is the NUMA node 30A including the page has been moved to the destination physical server 1B.

On the other hand, the hypervisor 7B of the destination physical server 1B controls the operations of the virtual CPU 40. In FIG. 10, although the NUMA node 30A is moved to the physical server 1B, the NUMA node 30B is not moved to the physical server 1B. The process 6 executed on the physical server 1B may access a page included in the memory 50B of the NUMA node 30B. Thus, the hypervisor 7B refers to the page status table 13B. And the hypervisor 7B suspends the virtual CPU 40A which executes the process 6 when the page status table 13B indicates "Not Yet" for the transfer status of the page accessed by the process 6, that is the NUMA node 30B including the page is not moved from the source physical server 1A.

<Process Flow>

Figure 14:
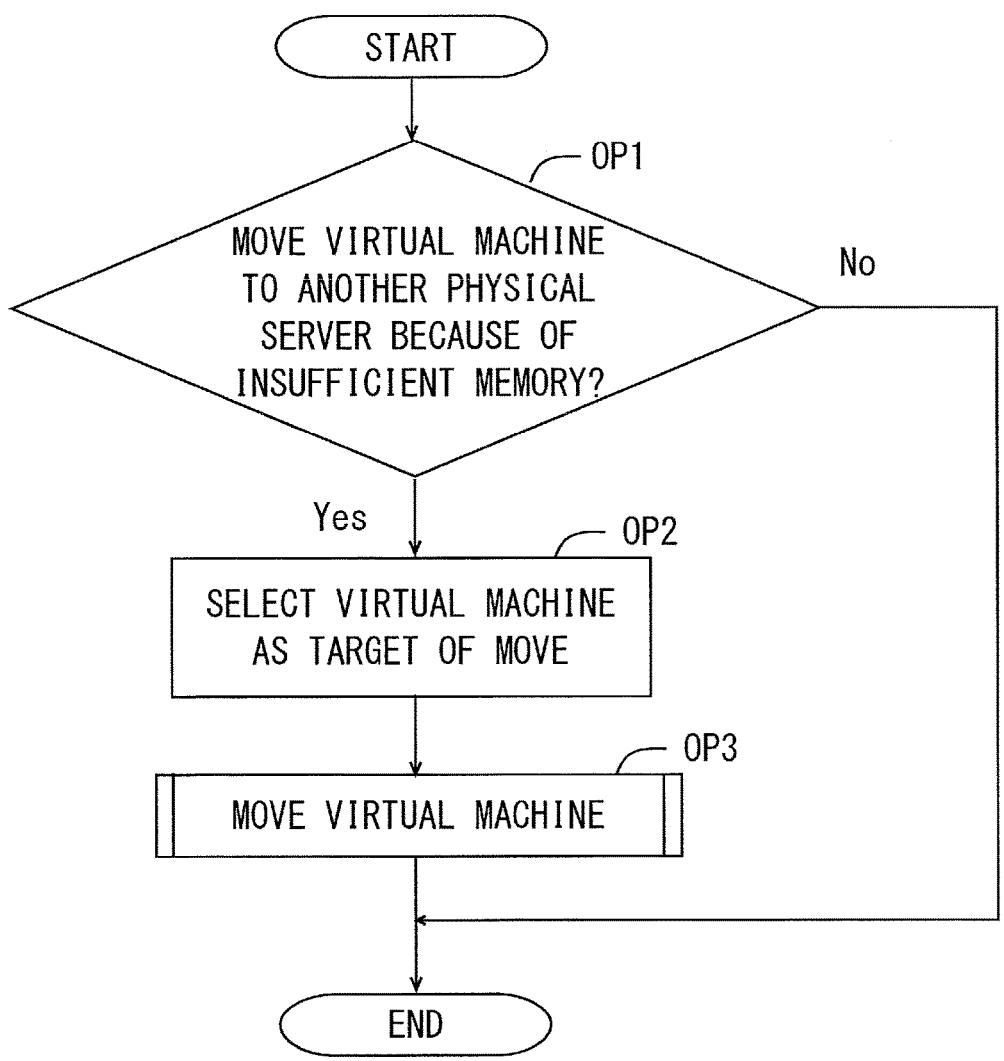
FIG. 14 is a diagram illustrating an example of a flowchart of a process for moving a virtual machine.
Figure 15:
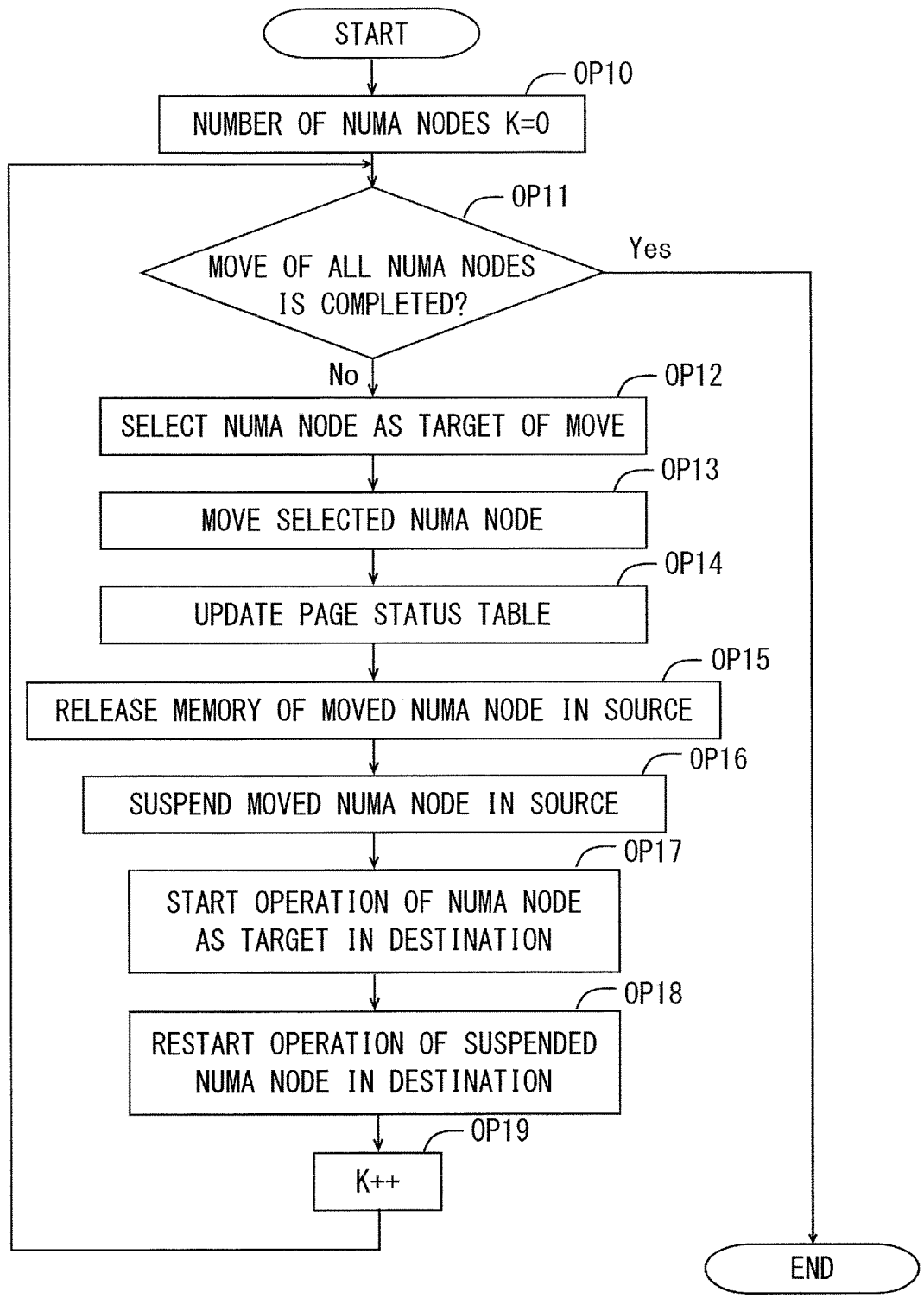
FIG. 15 is a diagram illustrating an example of a flowchart of a detailed process for moving a virtual machine.

FIGS. 14 to 16 illustrate processes for moving the virtual machine 2. The processes for moving the virtual machine 2 are described here as an example in which the virtual machine 2 is moved from the physical server 1A to the physical server 1B in FIGS. 8 to 12.

FIG. 14 illustrates an example of a flowchart of the processes for moving the virtual machine 2. The processes illustrated in FIG. 14 are started when the physical server 1A monitors the usage of the CPU 4 or the memory 5 and detects the load of the CPU 4 or the memory 5. Alternatively, the processes are started according to an instruction from the user.

In OP1, the CPU 4 of the physical server 1A determines whether the virtual machine 2 is moved to another physical server 1 because of insufficient memory. When the virtual machine 2 is moved to another physical server 1 (OP1: Yes), the process proceeds to OP2. When the virtual machine 2 is not moved to another physical server 1 (OP1: No), the CPU 4 terminates the processes of the flowchart.

In OP2, the CPU 4 of the physical server 1A selects a virtual machine 2 as a target of the move from the plurality of virtual machines which are operating on the physical server 1A. For example, the CPU 4 selects a virtual machine 2 as the target for which the number of system calls issued is smaller than the number of system calls issued for the other virtual machines. This is because the number of accesses by the NUMA node 30 of the virtual machine 2 as the target to a global memory area other than the memory 50 associated with the NUMA node 30 of the virtual machine 2 as the target is smaller than the number of accesses by the other NUMA nodes 30 to a global memory area. It is noted that the process in OP2 is an example of a process for "selecting, when the information processing apparatus operates a plurality of virtual machines, as a target of the move a virtual machine for which the number of calls for Operating System is smaller than the number of calls for the Operating System for other virtual machines of the plurality of virtual machines".

In OP3, the CPUs 4 of the physical servers 1A and 1B executes a process for moving the virtual machine 2 selected in OP2 from the physical server 1A to the physical server 1B and terminates the process of the flowchart.

FIG. 15 illustrates a flowchart of the processes for moving the virtual machine 2 in detail. The processes in FIG. 15 exemplify the processes in OP3 in FIG. 14. The virtual machine 2 is moved from the physical server 1A to the physical server 1B on a NUMA node basis. For example, the processes in FIG. 5 are started when the CPU 4 of the physical server 1A selects the virtual machine 2 as the target of the move.

It is noted that although the execution entity of the processes in FIG. 15 is the CPUs 4 of the physical servers 1A and 1B, the hypervisor 7A of the physical server 1A or the hypervisor 7B of the physical server 1B is the operation entity of the processes in the following descriptions.

In OP10, the hypervisor 7A initializes a variable K for counting the number of NUMA nodes 3 moved to the physical server 1B to K=0. In OP11, the hypervisor 7A determines whether the move of the NUMA node 30 included in the virtual machine 2 to the physical server 1B is completed. When the move of the NUMA node 30 included in the virtual machine 2 to the physical server 1B is completed (OP11: Yes), the CPU 4 terminates the processes of the flowchart. On the other hand, when the move of the NUMA node 30 included in the virtual machine 2 to the physical server 1B is not completed (OP11: No), the process proceeds to OP12.

In OP12, the hypervisor 7A selects a NUMA node 30 as a target of the move from NUMA nodes 30 included in the virtual machine 2. It is noted that the hypervisor 7A selects a NUMA node 30 as the target from the NUMA nodes 30 in ascending order of the number of accesses to pages beyond its own NUMA node 30. And the hypervisor 7A moves the selected NUMA node 30 to the physical server 1B. It is noted that the accesses to pages beyond its own NUMA node 30 mean accesses to pages included in the memory 50 in NUMA nodes 30 other than its own NUMA node 30 or a global memory area.

The NUMA node 30 for which the number of page accesses beyond its own NUMA node 30 is smaller than any other NUMA nodes 30 can be determined based on the number of issued system calls or the usage of the physical memory in the NUMA node 30. Namely, the lower the usage of the physical memory is, the lower the frequency of using the memory of NUMA nodes 30 other than its own NUMA node 30 is. And the lower the usage of the physical memory is, the smaller the number of accesses to pages beyond its own NUMA node 30 is. In addition, the smaller the number of issued system calls is, the smaller the number of accesses to a global memory area is. And the smaller the number of issued system calls is, the smaller the number of accesses to pages beyond its own NUMA node 30 is.

In OP13, the hypervisor 7A moves the NUMA node 30 selected in OP12 to the physical server 1B. The hypervisor 7A can be configured to use Live Migration to move the NUMA node 30 to the physical server 1B.

The processes in OP13 and OP14 are an example of a process for "moving the plurality of nodes in the virtual machine in ascending order of a number of accesses to the storage areas associated with other nodes among the plurality of nodes".

In OP14, the hypervisor 7A updates the page status table 13A to indicate that the transfer status for the page included in the memory 50 of the moved NUMA node 30 is "Done". In addition, the hypervisor 7B updates the page status table 13B to indicate that the transfer status for the page included in the memory 50 of the moved NUMA node 30 is "Done".

In OP15, the hypervisor 7A releases the memory 50 of the moved NUMA node 30 in the source physical server 1A. The process in OP15 is an example of a process for "releasing, after a first node of the plurality of nodes is moved, a storage area associated with the first node".

In OP16, the hypervisor 7A suspends the operation of the moved NUMA node 30 in the source physical server 1A. The process in OP16 is an example of a process for "suspending, when a second node of the plurality of nodes which is not moved to the another information processing apparatus accesses the storage area associated with the first node, the operation of the second node".

In OP17, the hypervisor 7B starts the operation of the moved NUMA node 30 in the destination physical server 1B. The process in OP17 is an example of a process for "starting, after a first node of the plurality of nodes in the first virtual machine is moved, operation of the first node". In addition, the process in OP17 is an example of a process for "moving the plurality of nodes in the first virtual machine on a node basis when the request is received".

In OP18, the hypervisor 7B restarts the operation of the suspended NUMA node 30 in the destination physical server 1B. It is noted that the NUMA node 30 suspended by the hypervisor 7B is the NUMA node 30 suspended by the hypervisor 7B because the NUMA node 30 moved to the physical server 1B accesses the memory 50 included in the NUMA node 30 which is not moved. Each time when the move of each NUMA node 30 is completed, the operation of the corresponding NUMA node 30 suspended in the destination physical server 1B is restarted so that the destination physical server 1B can continue the processes of the virtual machine 2.

In OP19, the hypervisor 7A increases the variable K by 1 which is used for counting the number of NUMA nodes 30 moved to the physical server 1B and the process proceeds to OP11. Since the processes in OP17 and OP18 are executed by the hypervisor 7B of the physical server 1B, the hypervisor 7A can be configured to execute the process in OP19 in parallel with the process in OP17 after the process in OP16 is completed.

FIG. 16 illustrates an example of processes for controlling the operation of the virtual CPU 40. The processes in FIG. 16 are started when a page fault occurs in the physical server 1A or the physical server 1B.

The page fault occurs when the process 6 executed in the source physical server 1A accesses a memory area which has been included in the memory 50 in the NUMA node 30 moved to the physical server 1B and has been released. In addition, the page fault also occurs when the process 6 executed in the destination physical server 1B accesses the memory 50 in the NUMA node 30 which has not been moved from the physical server 1A. So-called normal page faults other than the page faults described above also occur in the present embodiment.

It is noted that although the execution entity of the processes in FIG. 16 is the CPUs 4 of the physical servers 1A and 1B, the hypervisor 7A of the physical server 1A or the hypervisor 7B of the physical server 1B is the operation entity of the processes in the following descriptions.

In OP20, the hypervisor 7A determines whether the NUMA node 30 which includes the hypervisor 7A is in the destination physical server 1B and whether the move of the NUMA node 30 which includes a page accessed by the NUMA node 30 which includes the hypervisor 7A to the physical server 1B is completed. When the move of the NUMA node 30 which includes the page accessed by the NUMA node 30 which includes the hypervisor 7A to the physical server 1B is completed (OP20: Yes), the process proceeds to OP23. On the other hand, when the NUMA node 30 which includes the page accessed by the NUMA node 30 which includes the hypervisor 7A to the physical server 1B is not moved from the physical server 1A (OP20: No), the process proceeds to OP21.

In OP21, the hypervisor 7B determines whether the NUMA node 30 which includes the hypervisor 7B is in the destination physical server 1B and whether the move of the NUMA node 30 which includes a page accessed by the NUMA node 30 which includes the hypervisor 7B to the physical server 1B is completed. When the move of the NUMA node 30 which includes the page accessed by the NUMA node 30 which includes the hypervisor 7B to the physical server 1B is completed (OP21: Yes), the process proceeds to OP22. On the other hand, when the NUMA node 30 which includes the page accessed by the NUMA node 30 which includes the hypervisor 7B to the physical server 1B is not moved from the physical server 1A (OP21: No), the process proceeds to OP23.

In OP22, the CPU 4 of the physical server 1 which includes its own NUMA node 30 executes the processes of page fault handler implemented in the OS and the CPU 4 terminates the processes in the flowchart. In OP23, the hypervisor 7 of the physical server 1 which includes its own NUMA node 30 suspends the virtual CPU 40 of its own NUMA node 30, and the hypervisor 7 terminates the processes of the flowchart. The process in OP23 is an example of a process for "suspending, when the first node accesses a storage area associated with a second node which is not moved from the first virtual machine, the operation of the first node until move of the second node is completed".

<Effect of Embodiment>

The physical server 1 moves the virtual machine 2 to the destination physical server 1 on a NUMA node basis. When the move of a NUMA node 30 is completed, the physical server 1 releases the memory 50 associated with the moved NUMA node 30. As a result, the physical server 1 can swiftly release the memory 50 which has been used by the moved NUMA node 30. Therefore, the physical server 1 can swiftly resolve problems related to insufficient memory. In addition, the destination physical server 1 can start the operations of the moved virtual machines 2 as early as possible and continue the processes of the virtual machines 2 as seamless as possible.

When the NUMA node 30 which is not moved to the destination physical server 1 accesses the memory 50 of the NUMA node 30 moved to the destination physical server 1, the physical server 1 suspends the operation of the NUMA node 30 which is not moved to the destination physical server 1. As a result, when a virtual machine 2 is moved to the destination physical server with the virtual machine 2 being operating, the physical server 1 can prevent inconsistencies of data between the source physical server and the destination physical server.

The physical server 1 moves the NUMA nodes 30 included in the virtual machine 2 to the destination physical server 1 in ascending order of the number of accesses to the memory 50 in the other NUMA nodes 30. That is, since the NUMA nodes 30 are moved in ascending order of the number of accesses to pages beyond its own NUMA node 30, the number of cases in which the hypervisor 7 suspends the operation of the virtual CPU 40 decreases. As a result, the physical server 1 can swiftly move the virtual machine 2 to the destination physical server 1.

When the physical server 1 operates two virtual machines 2, the physical server 1 moves one of the virtual machines 2 for which the number of issued system calls is smaller than the number of issued system calls for the other machine to the destination physical server 1. As a result, the number of accesses to pages beyond its own NUMA node 30 and the number of cases in which the hypervisor 7 suspends the operation of the virtual CPU 40. Thus, the physical server 1 can swiftly move the virtual machine 2 to the destination physical server 1.

The destination physical server 1 accepts the move of the virtual machines 2 from the source physical server 1 on a NUMA node basis. When a moved NUMA node 30 accesses the memory 50 of a NUMA node 30 which is not moved from the source physical server 1, the destination physical server 1 suspends the operation of the moved NUMA node 30. When the move of the NUMA node 30 which is not moved from the source physical server 1 is completed, the destination physical server 1 restarts the suspended operation of the NUMA node 30. Therefore, the destination physical server 1 can start the operations of the moved virtual machines 2 as early as possible and continue the processes of the virtual machines 2 as seamless as possible.

<<Computer Readable Recording Medium>>

It is possible to record a program which causes a computer to implement any of the functions described above on a computer readable recording medium. In addition, by causing the computer to read in the program from the recording medium and execute it, the function thereof can be provided.

The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM. Further, a Solid State Drive (SSD) can be used as a recoding medium which is detachable from the computer or which is fixed to the computer.

According to one aspect, it is provided an information processing apparatus which starts the operation of a virtual machine moved from a source physical server to a destination physical server as early as possible and continues the processes of the virtual machine as seamless as possible.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus which operates a virtual machine in which a plurality of nodes associated with storage areas are included and in which the plurality of nodes mutually access the storage areas, the information processing apparatus comprising:
a processor; and
memory storing an instruction for causing the processor to execute:
receiving a request from a first information processing apparatus which operates a first virtual machine in which a plurality of nodes associated with storage areas are included and in which the plurality of nodes mutually access the storage areas, the request requesting for accepting move of the first virtual machine from the first information processing apparatus;
moving the plurality of nodes in the first virtual machine on a node basis when the request is received, in ascending order of a number of accesses to the storage areas associated with other nodes among the plurality of nodes; and
suspending, after moving of a first node of the plurality of nodes in the first virtual machine is completed and after an operation of the first node is started and when the first node accesses a storage area associated with a second node which is not moved from the first information processing apparatus, the operation of the first node until move of the second node is completed.

2. An information processing apparatus which operates a virtual machine in which a plurality of nodes associated with storage areas are included and in which the plurality of nodes mutually access the storage areas, the information processing apparatus comprising:
a processor; and
memory storing an instruction for causing the processor to execute:
moving the plurality of nodes in the virtual machine on a node basis to another information processing apparatus in ascending order of a number of accesses to the storage areas associated with other nodes among the plurality of nodes; and
suspending, after moving of a first node of the plurality of nodes is completed and after a storage area associated with the first node is released and when a second node of the plurality of nodes which is not moved to the another information processing apparatus accesses the storage area associated with the first node, the operation of the second node.

3. The information processing apparatus according to claim 2, wherein the processor further executes:
selecting, when the information processing apparatus operates a plurality of virtual machines, as a target of the move a virtual machine for which the number of calls for Operating System is smaller than the number of calls for the Operating System for other virtual machines of the plurality of virtual machines.

4. A method of moving a virtual machine, comprising:
controlling a first information processing apparatus which operates a virtual machine in which a plurality of nodes associated with storage areas are included and in which the plurality of nodes mutually access the storage areas to execute:
moving the plurality of nodes in the virtual machine on a node basis to a second information processing apparatus in ascending order of a number of accesses to the storage areas associated with other nodes among the plurality of nodes;
releasing, after a first node of the plurality of nodes is moved, a storage area associated with the first node; and controlling the second information processing apparatus to execute:

receiving a request for accepting move of the first node from the first information processing apparatus; and suspending, after moving of the first node is completed and after an operation of the first node is started and when the first node accesses a storage area associated with a second node which is not moved from the first information processing apparatus, the operation of the first node until move of the second node is completed.

5. A non-transitory computer-readable recording medium storing a program that causes an information processing apparatus which operates a virtual machine in which a plurality of nodes associated with storage areas are included and in which the plurality of nodes mutually access the storage areas execute:

receiving a request from a first information processing apparatus which operates a first virtual machine in which a plurality of nodes associated with storage areas are included and in which the plurality of nodes mutually access the storage areas, the request requesting for accepting move of the first virtual machine from the first information processing apparatus;

moving the plurality of nodes in the first virtual machine on a node basis when the request is received, in ascending order of a number of accesses to the storage areas associated with other nodes among the plurality of nodes; and suspending, after moving of a first node of the plurality of nodes in the first virtual machine is completed and after an operation of the first node is started and when the first node accesses a storage area associated with a second node which is not moved from the first information processing apparatus, the operation of the first node until move of the second node is completed.

* * * * *